(12) United States Patent
Fleming

(10) Patent No.: US 7,706,404 B2
(45) Date of Patent: Apr. 27, 2010

(54) USING THE DYNAMIC BEACON TO ENHANCE POWER SAVING CAPABILITIES FOR LOW POWER UWB DEVICES

(75) Inventor: Kristoffer D. Fleming, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 995 days.

(21) Appl. No.: 11/025,700

(22) Filed: Dec. 28, 2004

(65) Prior Publication Data

US 2006/0140215 A1 Jun. 29, 2006

(51) Int. Cl.
*H04J 3/16* (2006.01)
*H04J 3/22* (2006.01)

(52) U.S. Cl. .................. 370/468; 370/328; 370/336; 370/338; 370/443

(58) Field of Classification Search .......... 370/468, 370/337, 443, 328, 338, 80, 95.1, 110.1, 370/349, 401, 310; 375/132; 455/525, 41.2, 455/552.1, 445, 450, 451–453, 464
See application file for complete search history.

(56) References Cited

U.S. PATENT DOCUMENTS 7,197,025 B2 * 3/2007 Chuah .................. 370/338
2003/0016732 A1 * 1/2003 Miklos et al. ............. 375/132
2005/0249167 A1 11/2005 Salokannel
2005/0249170 A1 * 11/2005 Salokannel et al. ........ 370/338
2006/0040701 A1 * 2/2006 Long et al. ................ 455/525
2006/0211372 A1 * 9/2006 Shellhammer et al. ..... 455/41.2

FOREIGN PATENT DOCUMENTS

WO WO 2005/076533 A1 8/2005

OTHER PUBLICATIONS

PCT International Search Report and Written Opinion of the International Searching Authority, Application No. PCT/US2005/047272, filed Dec. 28, 2005.
PCT, International Preliminary Report on Patentability (Chapter I), Application No. PCT/US2005/047272.
"802.15.3 IEEE Standard for Information Technology; Part 15.3: Wireless medium Access Control (MAC) and Physical Layer (PHY) Specifications of High Rate Wireless Personal Area Networks (WPANs)" IEEE,, US, Sep. 29, 2003, pp. 8-16, 100, XP002329981.
Jung et al.: "An Energy Efficient MAC Protocol for Wireless LANs" Proceedings IEEE Infocom 2002. The Confrence on Computer Communica, vol. 1 of 3. Conf. 21, Jun. 3, 2002. pp. 1756-1764, XP010593744, ISBN: 0-7803-7476-2.

* cited by examiner

*Primary Examiner*—Ricky Ngo
*Assistant Examiner*—David Oveissi
(74) *Attorney, Agent, or Firm*—Scott M. Lane

(57) ABSTRACT

A wireless device dynamically adjusts its beacon period as devices join and disconnect from a network. The number of open beacon slots is programmable and maintained as devices join the piconet.

8 Claims, 4 Drawing Sheets

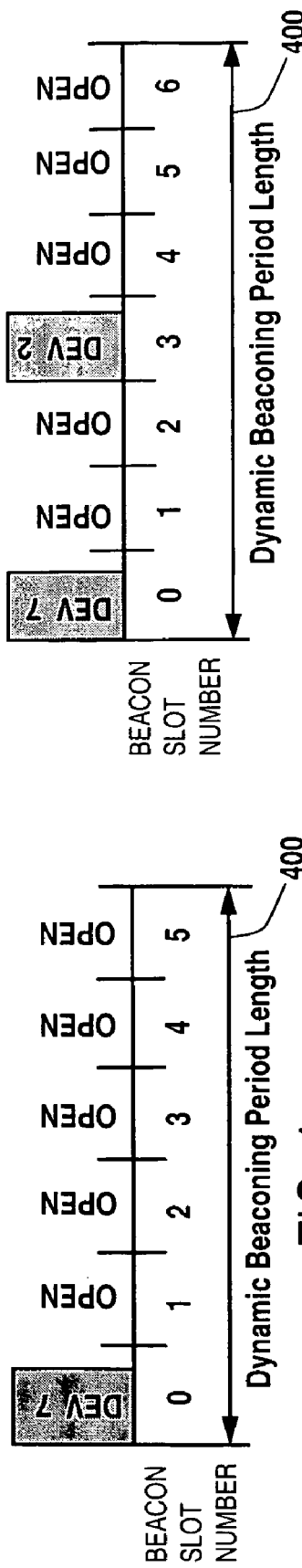
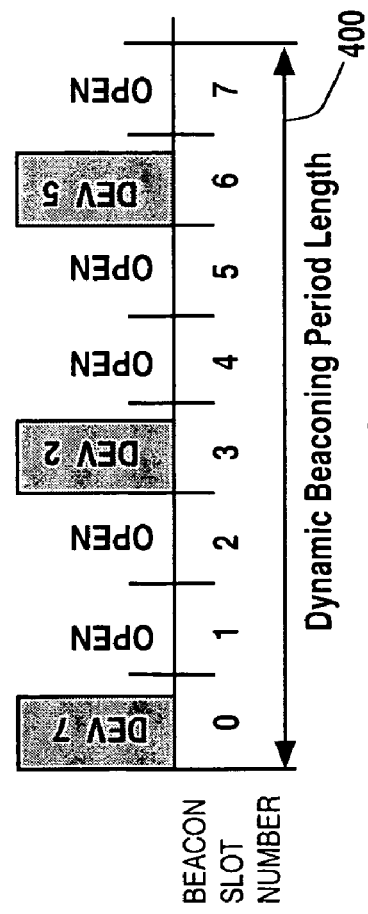
FIG. 4
FIG. 5
FIG. 6

USING THE DYNAMIC BEACON TO ENHANCE POWER SAVING CAPABILITIES FOR LOW POWER UWB DEVICES

The proliferation of mobile devices has created a demand for wireless Personal Area Networks (PANs) and Ultra-Wide Band (UWB) networks. The emergence of Bluetooth™ and Ultra-Wide Band (UWB) radio technologies leads to devices that monitor fixed beacon periods in order to join a network. In order to join the network, the device selects an open beacon slot provided in the fixed beacon period. A better way of joining a network is needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4-6 illustrate examples of an adjustable, dynamic beaconing period whose length changes as additional devices join a network.

Figure 1:
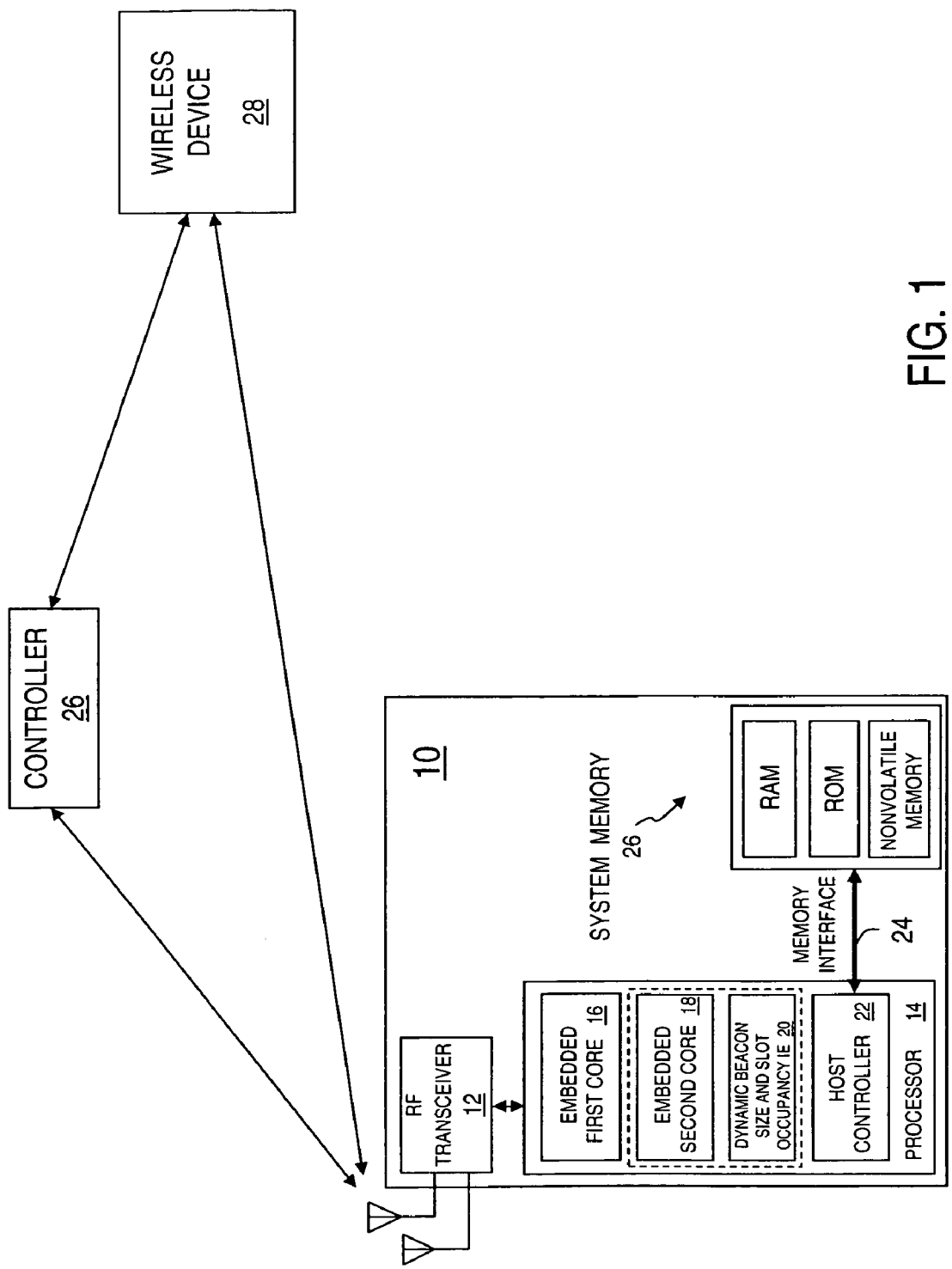
FIG. 1 is a diagram that illustrates wireless devices that incorporate circuitry and algorithms to enable devices to join a network in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

FIG. 1 illustrates features of the present invention that may be incorporated, for example, into a wireless communications device 10. In the wireless communications embodiment, a transceiver 12 both receives and transmits a modulated signal from one or more antennas. The analog front end transceiver may be a stand-alone Radio Frequency (RF) integrated analog circuit, or alternatively, be embedded with a processor 14 as a mixed-mode integrated circuit. The received modulated signal may be frequency down-converted, filtered, then converted to a baseband, digital signal.

Processor 14 may include baseband and applications processing functions that utilize one or more processor cores. Cores 16 and 18, in general, fetch instructions, generate decodes, find operands, and perform appropriate actions, then store results. The use of multiple cores may allow one core to be dedicated to handle application specific functions such as, for example, graphics, modem functions, etc. Alternatively, the multiple cores may allow processing workloads to be shared across the cores. A host controller 22 includes a hardware/software interface between the host controller software driver and the host controller hardware that exchanges data across memory interface 24 with a system memory 26. System memory 26 may include a combination of memories such as a Random Access Memory (RAM), a Read Only Memory (ROM) and a nonvolatile memory, although the type or variety of memories included in system memory 26 is not a limitation of the present invention. A Dynamic Beacon Size and Slot Occupancy (DBSSO) IE 20 stores and maintains parameters and will be described below.

Wireless communications device 10 may have applications in laptops, mobile phones, MP3 players, headsets, cameras, communicators and Personal Digital Assistants (PDAs), medical or biotech equipment, automotive safety and protective equipment, and automotive infotainment products that operate in a consumer's Personal Area Network (PAN). However, it should be understood that the scope of the present invention is not limited to these examples.

FIG. 1 further shows communications device 10 operating in a wireless network. In one embodiment, the network is a Personal Area Network (PAN) where communications device 10 simultaneously operates with a Pico Net Controller 26 and another wireless device 28. Communications device 10 and wireless device 28 support mobility and may operate in an airspace where interference may affect transmission quality. A beacon packet sent by Pico Net Controller 26 is used to synchronize signal transmissions of the devices located within the PAN.

Alternatively, communications device 10 may operate in an Ultra Wide Band (UWB) network, transmitting ultra-low power radio signals with very short electrical pulses across all frequencies. UWB enabled communication devices are suitable for use in relatively short range applications, such as Wireless Personal Area Networks (WPANs). Thus, controller 26 may be an access point that communicates with communications device 10 and wireless device 28 using the UWB short-pulse radio signals to transfer data over a wide range of frequencies.

As mentioned, communications device 10 may be enabled to operate in a PAN, WPAN or UWB network, or a combination thereof. Communications device 10, in general, is any type of device that is capable of announcing their presence in a network by sending periodic beacon packets. Mobile devices routinely scan for a controller (piconet controller or access point) that can provide acceptable radio link performance and support new members. By way of example, communications device 10 and wireless device 28 may use Bluetooth™ technology and be in compliance with the Industrial, Scientific, and Medical (ISM) band from 2.402 to 2.48 GHz. In this example, communication between these Bluetooth™ devices uses a digital frequency-modulation method and Time Division Duplexing (TDD), meaning that the transmitter and receiver alternate their transmissions in separate timeslots, one after the other. The Bluetooth™ devices connect using Bluetooth™ technology to form a piconet or network having up to eight devices.

Alternatively, communications device 10 and wireless device 28 may use UWB technology and operate in compliance with a wireless network standard such as ANSI/IEEE Std. 802.11, 1999 Edition, or ANSI/IEEE Std. 802.15, although this is not a limitation of the present invention. As used herein, the term "802.11" refers to any past, present, or future IEEE 802.11/802.15 standard, including, but not limited to, the 1999 edition.

Figure 2:
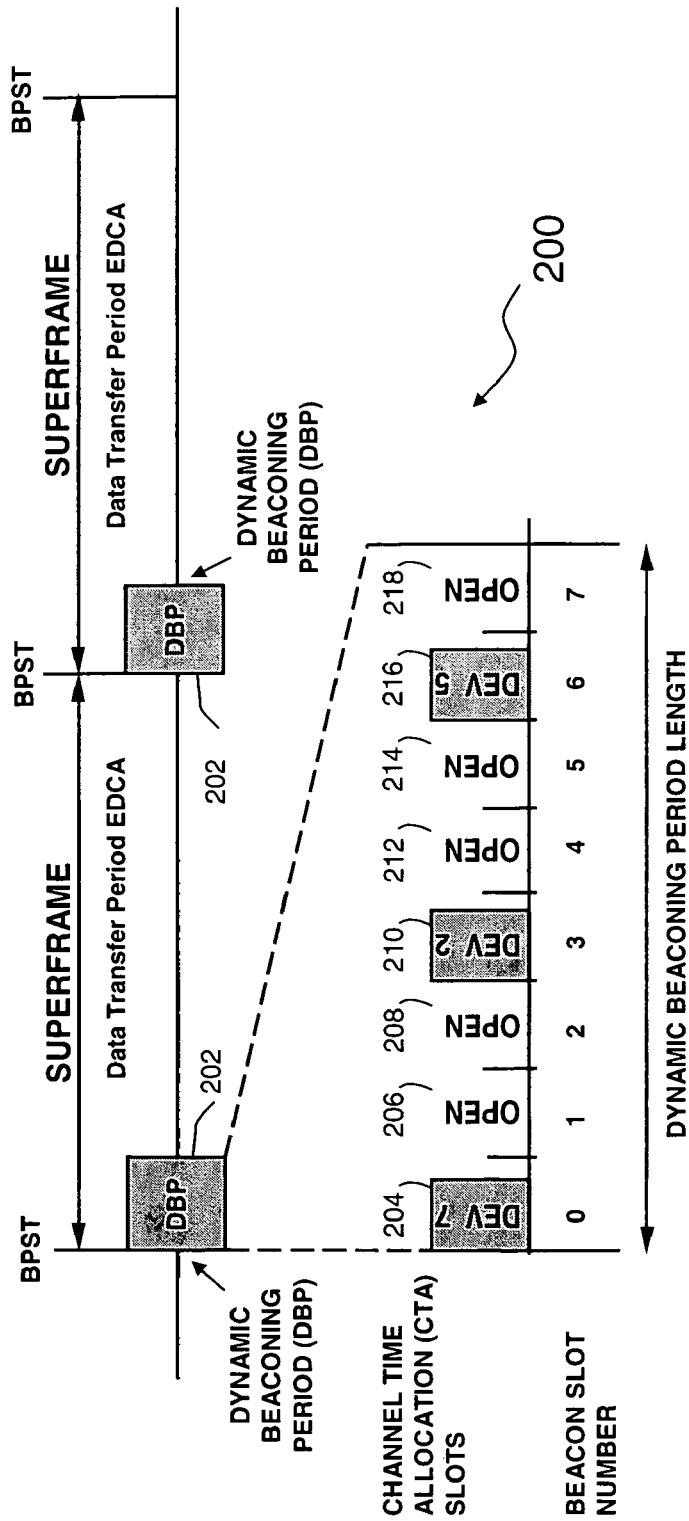
FIG. 2 shows time values for a super frame that illustrate a dynamic beaconing period used by a wireless device in joining with other devices in the network.

The diagram in FIG. 2 illustrates an example of time values for a super frame 200 that may be used in the communications between wireless device 10 and other devices in the network. A dynamic beaconing period 202 provides discoverable information about devices already joined in the Piconet, showing a device 7 previously assigned to Channel Time Allocation (CTA) slot 204, a device 2 previously assigned to CTA slot 210 and a device 5 previously assigned to CTA slot 216. In the example shown in FIG. 2, dynamic beaconing period 202 shows CTA slots 206, 208, 212, 214 and 218 as unoccupied and open to assignment for additional devices joining the Piconet.

Figure 3:
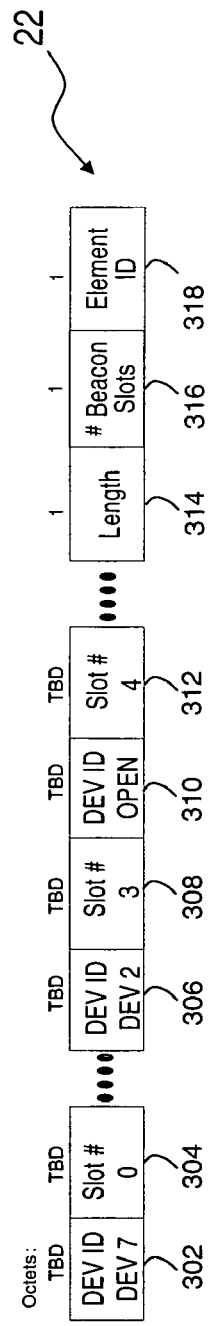
FIG. 3 shows examples of device and network parameters that may be stored by each wireless device enabled to operate in the network.

FIG. 3 shows examples of device and network parameters that may be stored by each wireless device enabled to operate in the network. These network parameters facilitate the operation of the wireless device in attempting to join the network. A Dynamic Beacon Size and Slot Occupancy (DBSSO) IE 20 stores the parameters. It should be noted that IE 20 may be register based, memory based, state machine based, or configured using combinational logic along with storage latches. Further note that the type of parameter storage is not intended to limit the claimed invention.

Some network parameters that may be stored by IE 20 include combination pairs of a DEVICE ID value and an assigned SLOT NUMBER value. As shown, the first combination pair includes a DEVICE ID in storage 302 and a slot number in storage 304. Referring to the example illustrated in FIG. 2, the DEVICE ID value retained in storage 302 corresponds to DEV 7 and the slot number value retained in storage 304 corresponds to slot # 0. IE 20 maintains additional combination pairs such as, for example, a DEVICE ID value in storage 306 that corresponds to DEV 2 and the slot number value in storage 308 that corresponds to slot # 3. Another combination pair maintained as a DEVICE ID value in storage 310 indicates an open slot and the slot number value in storage 312 indicates a new device may be assigned to open slot # 4.

In addition to the network parameters, IE 20 may store device parameters in storage 314, 316 and 318. Storage 316 may store a programmable value that may be based on an upper limit to the number of open slots allowed at any given time in the dynamic beaconing period. For instance, storage 316 may store a programmed value of 6, which corresponds to the upper limit of five open slots plus one additional slot. The multiple open slots provide a high probability for a successful Piconet join if multiple devices are simultaneously attempting to connect.

One inventive feature illustrated in FIGS. 2 and 3 shows that the length of the dynamic beacon period is not fixed, but rather the length is variable and based in part on the number of devices that are currently a member of the Piconet. Correspondingly, the number of combination pair values stored by IE 20 is also not fixed, but dynamically variable and allowed to increase as devices successfully join the Piconet and decrease as devices disconnect. Also, the number of open slots may be regulated by wireless device 10, and hence, the length of the dynamic beacon period may be adjusted accordingly to the selected number of open beacon slots. By dynamically adjusting the beaconing period, the amount of time for data transfers may be increased, which reduces the overall fixed overhead of the superframe. A further advantage of dynamically adjusting the beaconing period involves a reduction in the amount of time devices, such as wireless device 10 and wireless device 28, consume power while listening to the beacon period.

FIGS. 4-6 illustrate sequential examples of a dynamic beaconing period whose length is adjusted as additional devices join the network to communicate with devices presently connected in the network. The embodiment shown in FIG. 4 corresponds to IE 20 (see FIG. 3) storing a value for five open slots as the upper limit of open slots in storage 316. Consequently, the programmed parameter value stored in storage 316 may have a value of 6, which corresponds to the upper open slot limit plus one additional slot. Thus, FIG. 4 shows dynamic beaconing period 400 having six slots in accordance with the stored parameter value in storage 316, with five slots being open and one device (DEV 7) joined in the Piconet.

FIG. 5 illustrates a continuing example showing the adjustment made to dynamic beaconing period 400 when an additional device joins the Piconet. Note that devices already joined in the Piconet send a beacon during their assigned beacon slot time. A device desiring to join the Piconet scans for open beacon slots. A beacon period may contain 64 or 128 beacons slots, with the number of beacon slots being a factor that limits the number of devices that may be active in the same Piconet. Upon finding at least one open, available slot, the device randomly selects an open slot, as shown in the figure where device 2 has selected slot 3 and joined the Piconet.

FIG. 5 shows that the dynamic beaconing period has been extended from six beacon slots to seven beacon slots. Thus, the minimum number of open beacon slots is maintained at five (as reflected by the parameter value of five stored in storage 316). Other devices may listen to each of the beacon slots transmitted by the joined devices and determine which devices are in the Piconet and which beacon slot are open. Devices desiring to join the Piconet then find and identify empty beacon slots and randomly pick one of the empty beacon slots. Thus, with the addition of device 2 in the Piconet, the dynamic beaconing period length is adjusted to add another new beacon slot that maintains the number of open beacon slots at five. Device 2, having joined the Piconet, now beacons during slot 3 in the next beacon period. Other devices that attempt to join the Piconet and be assigned to an open beacon slot may determine if their attempt to join was successful by monitoring the "Beacon Slot Occupancy" Information Element (IE) in the beacons of other devices currently joined in the Piconet.

Continuing with the example, FIG. 6 illustrates dynamic beaconing period 400 after a third device joins the Piconet. Again, the device desiring to join the Piconet scans for open beacon slots and randomly picks one of the open slots. As shown in the figure, a device 5 joins the Piconet in slot 6 and the dynamic beaconing period is extended by one beacon slot to maintain the minimum number of open beacon slots at five. Thus, the dynamic beaconing period length has adjusted from seven beacon slots to eight beacon slots when device 5 joins the Piconet.

Figure 7:
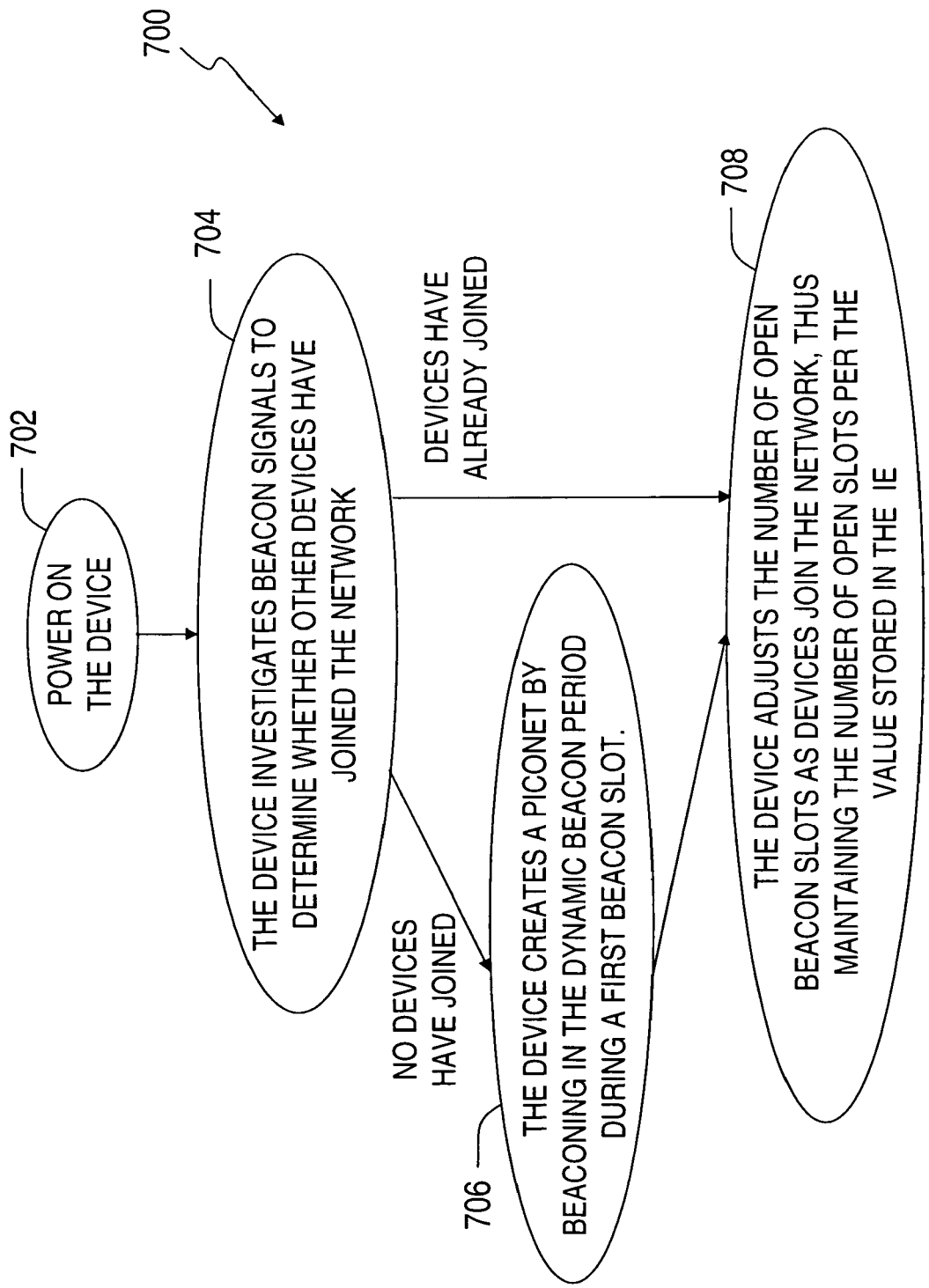
FIG. 7 is a flow diagram illustrating operation of the wireless device attempting to join the network in accordance with the present invention.

FIG. 7 is a flow diagram 700 describing an algorithm and method used by wireless device 10 in joining a network. Wireless device 10 powers on (process 702) and investigates received signals (process 704), looking for a beaconing period to determine whether other devices have jointed the network. Devices currently joined in the Piconet provide a beacon during their assigned beacon slot in the beaconing period. If wireless device 10 does not find the beacon period, the device creates a Piconet by beaconing in the dynamic beacon period during the first beacon slot (process 706). Wireless device 10 stores IE 20 information such as, for example, the number of beacon slots and occupancy information for each beacon slot. The beacon transmitted by the joined devices includes additional open beacon slots that are unoccupied, allowing additional devices to join the Piconet.

Devices join the Piconet by randomly selecting an open beacon slot. After one or more devices successfully join the Piconet, the parameter value in storage 316 (see FIG. 3) is increased to ensure that the number of open beacon slots remains equal to the value selected (process 708). This process continues, with wireless device 10 dynamically adjusting the length of its beaconing period when devices join and disconnect from the network. Thus, wireless device 10 provides a programmable limit to the size of the "Number of Beacon slots" parameter in DBSSO IE 20.

If more than one device attempts to join the Piconet in the same beacon period, there is a possibility that multiple devices may choose the same open beacon slot. This contention for the same open slot may be resolved by the devices randomly picking a new open beacon slot. Then, during the next superframe the devices beacon in the new beacon slot. If again multiple devices have chosen the same open beacon slot, these devices may then wait a random number of superframes before providing another beacon. The random number corresponds to a Contention Resolution Wait Count (CRWC) parameter.

By now it should be apparent that the present invention enhances the execution of wireless devices to join and disconnect from a network. The present invention allows the beacon period to be adjusted dynamically to improve the amount of time for data transfers and reduce the amount of time devices consume power while listening to the beacon period.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of joining a network using a communications device, comprising:
   scanning for a first beacon in a personal area network;
   receiving the first beacon in a first dynamic beacon period, the first dynamic beacon period comprising a plurality of unoccupied beacon slots and an occupied beacon slot;
   selecting an unoccupied beacon slot from the plurality of unoccupied beacon slots;
   receiving the first beacon in a second dynamic beacon period, wherein the second dynamic beacon period comprises the first beacon and the plurality of unoccupied beacon slots;
   transmitting a second beacon from the communications device in the unoccupied beacon slot of the second dynamic beacon period to join the network;
   receiving the first beacon, and a third beacon, in a third dynamic beacon period, wherein the third dynamic beacon period also comprises the plurality of unoccupied beacon slots;
   transmitting the second beacon in the unoccupied beacon slot of the third dynamic beacon period;
   monitoring an information element in the first beacon of the third dynamic beacon period to determine occupancy information of the third dynamic beacon period and to determine if the communications device has joined the network; and
   receiving the first beacon, in a fourth dynamic beacon period also comprising the plurality of unoccupied beacon slots, wherein the fourth dynamic beacon period is shorter in length than the third dynamic beacon period.

2. A method for joining a network using a communications device, comprising:
   scanning for a beacon in a personal area network;
   establishing a first dynamic beacon period using the communications device when the beacon is not detected, the first beacon period comprising a first beacon and a plurality of unoccupied beacon slots, the first dynamic beacon period having a first length;
   receiving a second beacon in one of the plurality of unoccupied beacon slots;
   creating a second dynamic beacon period by adding an unoccupied beacon slot to the plurality of unoccupied beacon slots;
   transmitting the first beacon and receiving the second beacon in the second dynamic beacon period, wherein the second dynamic beacon period also comprises the plurality of unoccupied beacon slots; and
   monitoring an information element in the second beacon of the second dynamic beacon period to determine occupancy information in the second dynamic beacon period and to determine if the communications device is in the network.

3. The method of claim 2 further including:
   storing a device identification of the second beacon and a slot number of an unoccupied beacon slot to which the second beacon is assigned.

4. The method of claim 3 further including:
   providing a variable amount of storage to store the device identification and the slot number.

5. The method of claim 2 further including:
   adjusting the length of the second dynamic beacon period as other devices join and disconnect from the network to maintain the number of plurality of unoccupied beacon slots at a stored value.

6. The method of claim 1, further including:
   detecting another beacon in the unoccupied beacon slot;
   selecting another unoccupied beacon slot from the plurality of unoccupied beacon slots;
   transmitting the second beacon in the another unoccupied beacon slot; and
   receiving the another beacon and the first beacon in the second dynamic beacon period, wherein the second dynamic beacon period also comprises the plurality of unoccupied beacon slots.

7. The method of claim 6, further including:
   waiting a random number of superframes before transmitting the second beacon.

8. The method of claim 1, wherein the unoccupied beacon slot is randomly selected from the plurality of unoccupied beacon slots.

* * * * *